United States Patent
Kurebayashi et al.

(10) Patent No.: US 6,487,154 B1
(45) Date of Patent: Nov. 26, 2002

(54) LASER DRIVE UNIT AND INFORMATION RECORDING/REPRODUCING APPARATUS

(75) Inventors: Masaaki Kurebayashi, Ebina (JP); Akihiro Asada, Chigasaki (JP); Toshimitsu Kaku, Sagamihara (JP); Hideo Oonuki, Yokohama (JP); Takashi Hoshino, Yokohama (JP); Hidehiko Kandou, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/490,598

(22) Filed: Jan. 25, 2000

(30) Foreign Application Priority Data

Jan. 25, 1999 (JP) .............................. 11-015376

(51) Int. Cl.[7] .............................................. G11B 5/55
(52) U.S. Cl. ..................................................... 369/53.26
(58) Field of Search ................................. 369/116, 100, 369/94, 53.26, 53.27; 372/31, 38.07

(56) References Cited

U.S. PATENT DOCUMENTS

| | | | | |
|---|---|---|---|---|
| 4,789,974 A | * | 12/1988 | Satoh et al. | 250/201.5 |
| 5,005,164 A | * | 4/1991 | Sakamoto et al. | 369/116 |
| 5,216,659 A | * | 6/1993 | Call et al. | 369/116 |
| 5,450,383 A | * | 9/1995 | Call et al. | 369/100 |
| 5,539,721 A | * | 7/1996 | Yanagawa et al. | 369/116 |
| 5,563,898 A | * | 10/1996 | Ikeuchi et al. | 372/38.07 |
| 5,966,395 A | * | 10/1999 | Ikeda | 372/31 |

* cited by examiner

Primary Examiner—William Korzuch
Assistant Examiner—Kimlien T. Le
(74) Attorney, Agent, or Firm—Townsend and Townsend and Crew LLP (57) ABSTRACT

A laser drive (LD) unit 1 according to the present invention is provided with a laser drive waveform controller 6, into which information for setting the laser drive is entered from a controller 2, for generating a laser drive waveform on the basis of that information and supplying an indicated amperage; an LD current setting unit 7 for setting a laser drive current matching the indicated amperage; an LD current output unit 8 for varying the laser drive current on the basis of the laser drive waveform and supplying the current so varied to a laser diode 3; and a current setting corrector 9, into which a monitor signal obtained at the time of monitoring the laser beam emission from the laser diode 3 is monitored, for correcting the laser drive current set by the current setting unit 7 by using that monitor signal to adjust the power of the laser diode 3. The laser drive waveform controller 6, current setting unit 7, current output unit 8 and current setting corrector 9 are formed on the same substrate.

10 Claims, 5 Drawing Sheets

LASER DRIVE UNIT AND INFORMATION RECORDING/REPRODUCING APPARATUS

BACKGROUND OF THE INVENTION

The present invention relates to an information recording and reproducing technique for recording or reproducing data onto or from an optical disk, and more particularly to a technique for controlling laser beam power emitted from a semiconductor laser during recording of the disk.

One way of recording information onto an optical disk is to irradiate the disk with a laser beam when recording a datum representing information "1" and not to irradiate the disk with the laser beam when recording a datum representing information "0", i.e. by so called on/off control.

In recent years, however, optical disk recording and reproducing techniques permitting data recording and reproduction at higher densities have become required. Techniques known as one beam overwriting, and write strategy (by which the current waveform used for driving the laser) is pulse-divided to provide multi-value levels to control the recording power of the laser have become indispensable. Especially where overwriting is done, or data are recorded by switching a plurality of power levels to accomplish waveform control for high density mark formation, a plurality of amperages must be switched. In doing so, the laser power at each level must be accurately controlled.

Because each semiconductor laser has its own temperature characteristic, it is usually necessary to control the drive current provided to the laser according to the temperature. One well known method for such control is automatic power control (APC). Conventional APC techniques include, for example, the technique in Japanese Patent Laid-open Publication No. Hei 6-338073. In this example, part of the laser beam emitted by the semiconductor laser is detected with a photodiode, and the detected current is converted with a current-voltage conversion circuit, provided to an amplifier, converted by analog-to-digital (A/D) conversion, and provided to a controller.

This prior art technique, because it uses a configuration in which APC control is accomplished by a controller, makes recording or reproduction of data onto and from an optical disk difficult. Thus, recently, the need for high density mark formation complicats the waveform control of the laser drive current, entailing an increase in the number of laser power levels and finer pulse division, and also necessitating high speed switching of a large number of laser power levels. Because the controller and the laser drive section are relatively distant from each other in a conventional laser drive apparatus, high speed switching of current are susceptible to timing delay, increasing the risk of distortion of the data to be recorded on the optical disk.

In APC operation, the laser power is monitored and corrected by the controller which is distant from the laser drive section, and is therefore susceptible to noise and a consequent risk of erroneous operation. Furthermore, the number of conducting lines connecting the laser drive section and the controller increases, making it difficult to efficiently utilize the mounting space.

The present invention provides a laser drive unit capable of recording/reproduction at high accuracy, even on an optical disk for high density recording. It also provides an information recording and reproducing apparatus mounted with that laser drive unit.

SUMMARY OF THE INVENTION

According to a preferred aspect of the invention, a system comprising a waveform controller receives information for a desired laser drive setting from an external controller. The controller provides a laser drive waveform on the basis of that information and at an indicated amperage. The system also includes a current setting unit for setting a laser drive current to match the indicated amperage; a current output unit for adjusting the laser drive current to the laser drive waveform and supplying the adjusted output to a laser diode; and a current setting corrector. The corrector monitors the laser beam emission from the laser diode and corrects the laser drive current set by the current setting unit. The result is precise adjustment of the laser diode power. Preferably, the laser drive waveform controller, current setting unit, current output unit and current setting corrector are formed as a single integrated circuit, or at least on a common substrate.

This configuration, in which the laser drive waveform controller, current setting unit, current output unit and current setting corrector are formed on the same substrate, allows these constituent elements to be in mutually close positions, thus reducing timing lags in laser drive current, and reducing distortion of the data waveform. As a result, data is recorded and reproduced with high accuracy even on high density recording optical disks.

According to another aspect of the invention, a system comprises a laser drive waveform controller, into which information for laser drive setting is entered from an external controller. The system generates a laser drive waveform on the basis of that information and supplies an indicated amperage. It also includes a current setting unit for setting the laser drive current to match the indicated amperage; and a current output unit for adjusting the laser drive current with the laser drive waveform and supplying the adjusted output to a laser diode. Finally, it includes a current setting corrector for monitoring the laser beam emission from the laser diode and correcting the laser drive current set by the current setting unit by digitally processing the monitored signal to adjust the amperage, thereby adjusting the laser diode power. As before, the laser drive waveform controller, current setting unit, current output unit and current setting corrector are preferably formed on the same chip or substrate. This configuration minimizes timing lags, reduces distortion of the data waveform, and makes possible recording and reproduction of data with high accuracy to or from even high density recording optical disk.

DESCRIPTION OF THE SPECIFIC EMBODIMENTS

Figure 1:
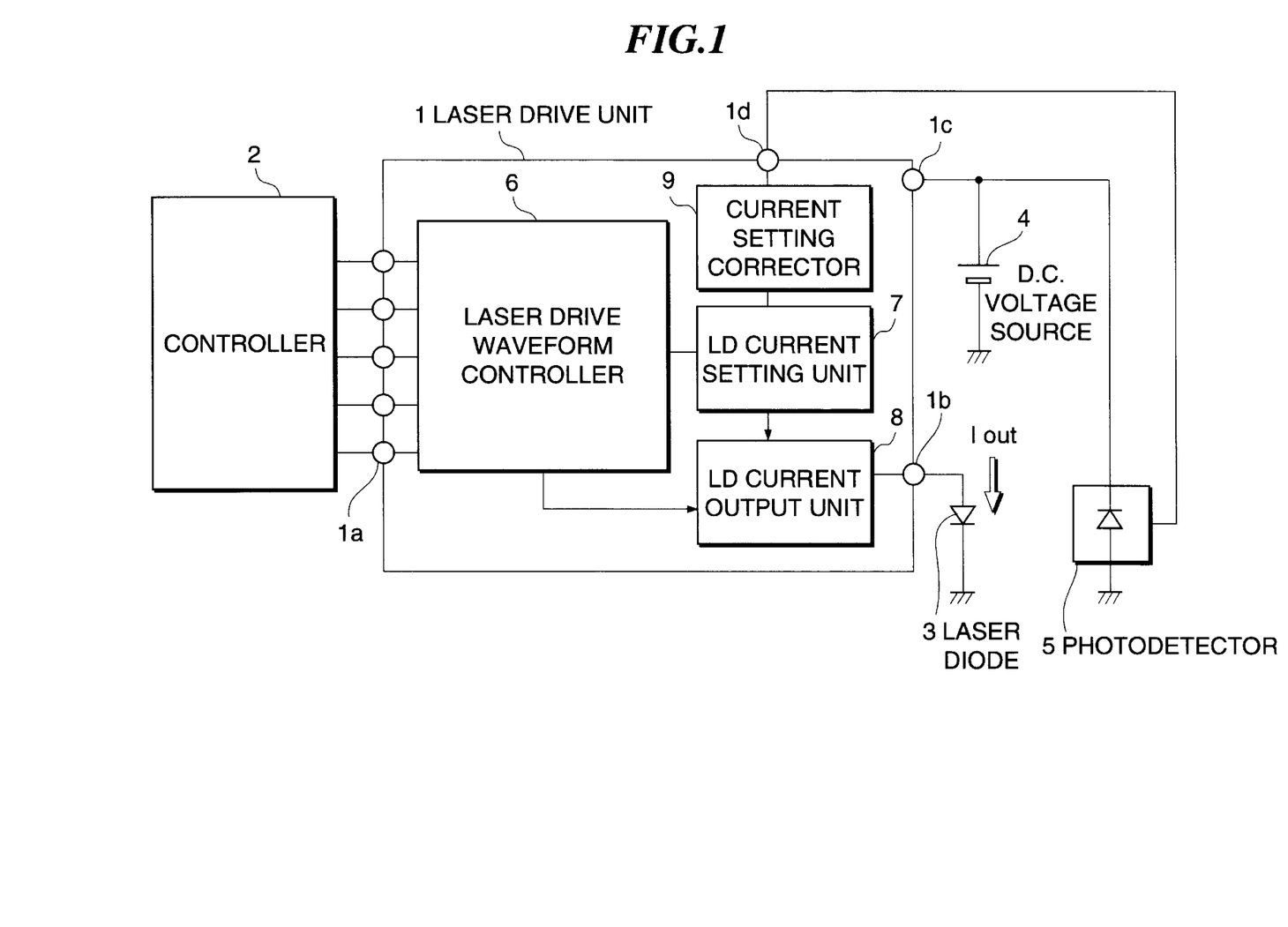
FIG. 1 is a block diagram of a laser control unit according to a preferred embodiment of the present invention.

FIG. 1 is a block diagram illustrating a laser control unit in one embodiment of the invention. As shown in FIG. 1, a laser drive unit 1 to which a controller 2 is connected, is provided with input terminals 1a for receiving information from the controller 2, and an output terminal 1b which is connected to a laser diode 3 and supplies a drive current to the laser diode 3. The system also includes a power supply terminal 1c connected to a 5 V DC voltage source 4, and an input terminal 1d which is connected to a photodetector 5. Photodetector 5 is an external monitor connected to a DC voltage source 4, which in turn is connected to the power supply terminal 1c.

The laser drive unit 1 is intended to enable the laser diode 3 to emit a laser beam at a prescribed power level, timing and pulse width. The laser drive unit 1 includes a laser drive waveform controller 6, a laser diode (LD) current setting unit 7, a laser diode current output unit 8, and a current setting corrector 9. The waveform controller 6, LD current setting unit 7, LD current output unit 8 and current setting corrector 9 are preferably formed on the same substrate. This is usually separate from the substrate on which the controller 2 is formed, but need not be. The waveform controller 6 is connected to the input terminal 1a; the LD current output unit 8 to the output terminal 1b; and the current setting corrector 9 to the input terminal 1d.

In accordance with various control signals from the external controller 2 via the input terminals 1a, the laser drive waveform controller 6 generates the drive signal waveform for the laser drive current. The LD current output unit 8, using this control waveform, drives the laser diode 3. The level of the laser drive current is determined by the LD current setting unit 7 in accordance with the indicated amperage from the laser drive waveform controller 6. Typically, the laser power is proportional to the level of the laser drive current. Therefore, if the level of the laser drive current is raised, the laser power will rise, or if the level of the laser drive current is lowered, the laser power will drop. Further, even if the waveform of the laser drive current remains the same, if the level of the laser-drive current rises, the laser power in that drive waveform will rise, while if the level of the laser drive current falls, the laser power in that drive waveform will drop.

Figure 2:
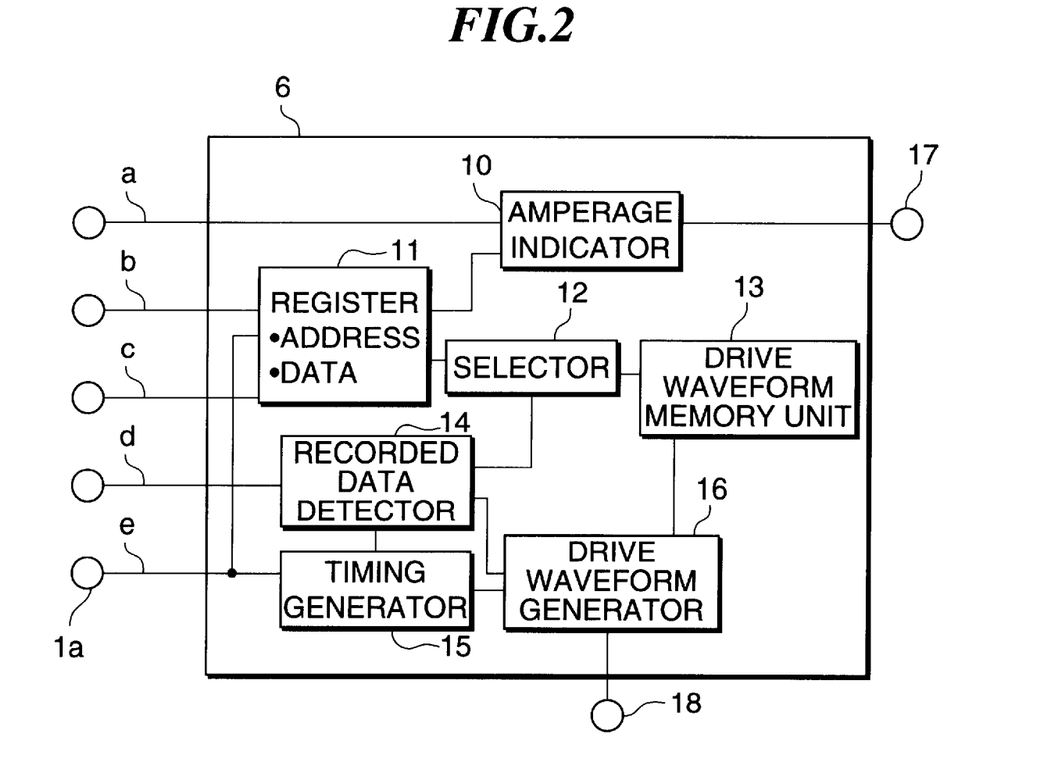
FIG. 2 illustrates the internal configuration of the waveform controller.

FIG. 2 is a block diagram illustrating the internal configuration of the waveform controller 6. Within the waveform controller 6, there are provided an amperage indicator 10, a register 11, a selector 12, a drive waveform memory unit 13, a recorded data detector 14, a timing generator 15, and a drive waveform generator 16. The waveform controller 6 receives five kinds of control signals via the input terminal 1a of the laser drive unit 1. They are: a control signal a for amperage setting, a signal b for mode setting, a signal c as the waveform parameter, a signal d as actual recording data, and a clock signal e for timing generation. Each control signal is synchronized with the clock signal e, and encoded as multiple-bit serial data to be transmitted.

Control signal a for amperage setting is transmitted as eight-bit serial data, and converted into an amperage by the amperage indicator 10. The register 11 performs condition setting, switching of the operating mode between recording and reproduction, and setting of the recording waveform condition. Upon receiving input signal b for mode setting, it changes state to an initial state. The register 11 also generates a laser drive waveform on the basis of the recording clock timing from the timing generator 15 and the waveform parameter c. The output timing of the waveform so generated, in the recording and reproducing state, causes the register to determine the output timing of data in response to the entry of the mode setting signal b. In this instance, drive current is supplied by setting the register to provide an output.

The recorded data detector 14 receives a two-valued signal, such as an NRZI signal, as signal d, and shapes this NRZI signal on the basis of the clock signal e to the timing of the recording clock generated by the timing generator 15. Because the pattern may be adjusted depending on the pulse length, the recorded data detector 14 delivers information on the pulse to the selector 12. The selector 12 compares the pulse information and the waveform information from the register 11. On the basis of this comparison, prescribed pulse information is selected from the drive waveform memory unit 13, and a drive waveform is generated by the drive waveform generator 16 from the selected waveform information and actual recording data from the recorded data detector 14. Terminal 17 is a connection terminal for connecting the amperage indicator 10 to the LD current setting unit 7. Terminal 18 is a connection terminal for connecting the drive waveform generator 16 to the LD current output unit 8.

As shown in FIG. 1, part of the laser beam from the laser diode 3 is detected by the photodetector 5, and the resulting detection signal is provided to the current setting corrector 9 within the laser drive unit 1 via the input terminal 1d. The current setting corrector 9 corrects the amperage of the laser drive in the LD current setting unit 7 in accord with the monitor signal. In this embodiment, the accuracy of the amperage setting is determined by the LD current setting unit 7, and that of the amperage correction is determined by the current setting corrector 9. Ultimately, the corrected amperage is switched in accordance with the drive waveform from the drive waveform generator 16 of the waveform controller 6 in the LD current output unit 8, and supplied from the output terminal 1b to the laser diode 3.

The relationship between the laser drive current and the output signal from the photodetector 5 differs with any difference in the characteristics of the laser diode 3, tolerances in the characteristics of the photodetector 5 and their exact positions, among other factors. It is therefore desirable to adjust it for each individual optical disk drive. In this embodiment, a coefficient correcting circuit for correcting this relationship is provided within the current setting corrector 9. The current setting corrector 9, after assembly as a drive unit, reads in information needed for compensating for differences in LD and photodiode characteristics, and tolerances in assembly positions through the controller 2, and performs coefficient correction in accordance with this information to achieve the optimal laser power setting. It may also be disposed to read in information on disk characteristics (individual data on disk characteristics, format or the semiconductor laser) written onto the optical disk in advance and, on the basis of this information, to have coefficient correction performed by the current setting corrector 9 via the controller 2.

Some of these factors are attributable to temperature variations between the LD current setting unit 7 and the current setting corrector 9. For instance, if the LD current setting unit 7 varies significantly in temperature, while the current setting corrector 9 does not, the aforementioned coefficient correction should match the temperature variation of the LD current setting unit 7. If the temperature varies equally, however, the coefficient correction can be accomplished by introducing a constant coefficient.

As described above, this embodiment, in which the laser drive waveform controller 6, LD current setting unit 7, LD current output unit 8 and current setting corrector 9 are formed on the same substrate, the timing lag of the laser drive can be minimized and the distortion the data waveform minimized. As a result, recording/reproduction can be accomplished at high accuracy even on a high density recording optical disk.

Furthermore, because this embodiment can continuously adjust the laser drive current with its current setting corrector 9, it can set the correction accuracy independently of the LD current setting unit 7. This results in greater freedom, allowing choice between setting at high accuracy and reduced circuit dimensions and reduced cost at the sacrifice of accuracy. Moreover, as hardware information can be individually set in advance, more accurate settings are made possible. By integrating these circuits, amperage errors due to temperature differences between the LD current setting unit 7 and the current setting corrector 9 can be eliminated because they operate at substantially the same temperature, providing the benefit of more accurate current control.

Figure 3:
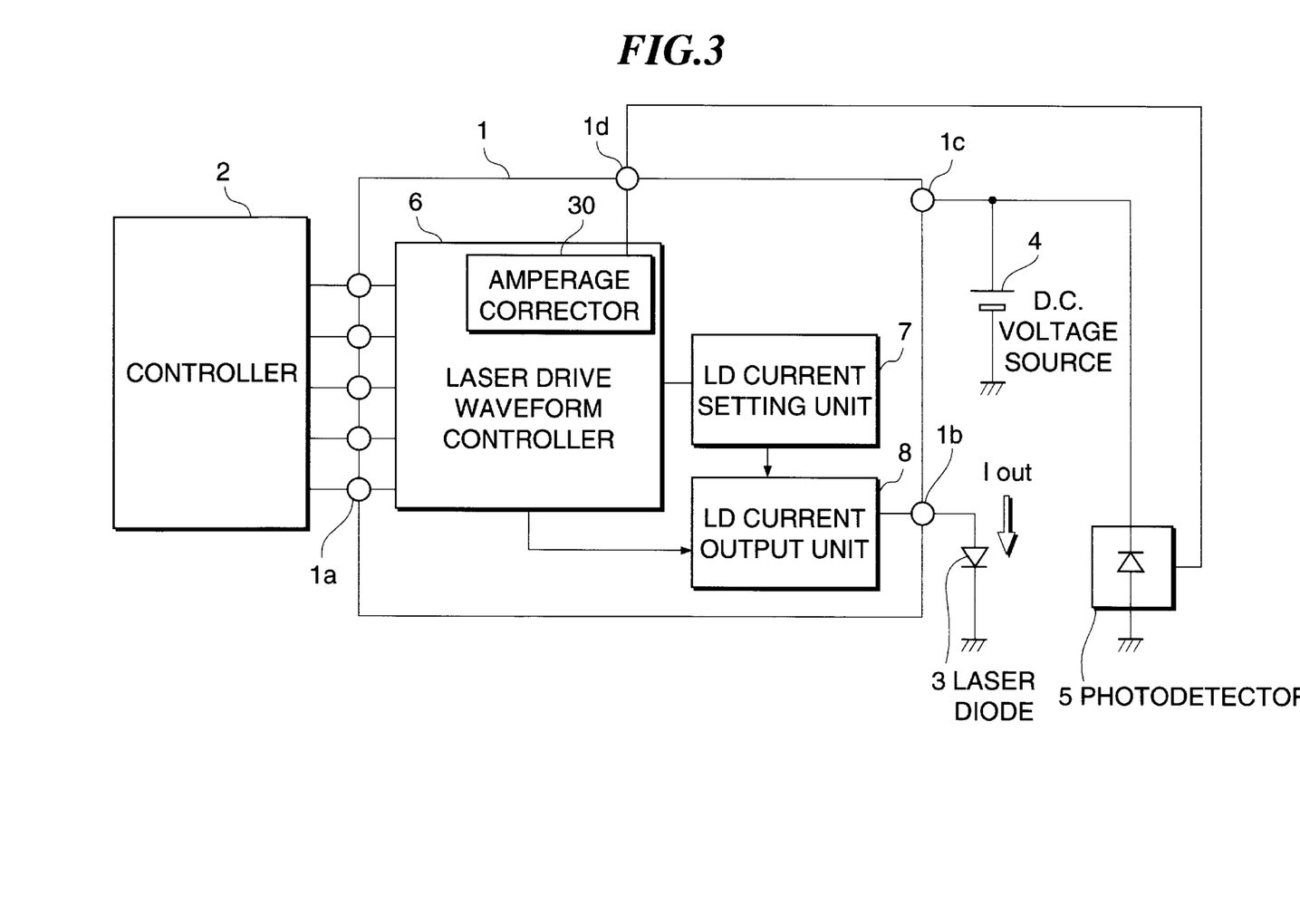
FIG. 3 is a block diagram of another configuration of the laser control unit according to the preferred embodiment of the invention.

FIG. 3 is a block diagram of a laser drive unit for another preferred embodiment of the invention. In this embodiment, an amperage corrector 30 is provided within the laser drive waveform controller 6 so that a monitor signal from the photodetector 5 can be fed back to the amperage corrector 30. In this embodiment, the laser drive waveform controller 6 includes an amperage corrector 30 within it, while LD current setting unit 7 and LD current output unit 8 are integrated on the same substrate, one which is separate from that of controller 2.

According to the above-described configuration, the amperage corrector 30 sends to the amperage indicator 10 (see FIG. 2) data resulting from conversion and correction of the fed back monitor signal, and the amperage indicator 10 converts it into a necessary indicated amperage and supplies it. The supplied indicated amperage is introduced into the LD current setting unit 7, which sets the laser drive current to a prescribed amperage, according to the above indicated amperage. The laser drive current at that set amperage is supplied to the LD current output unit 8, which supplies the laser drive current to the laser diode 3 while switching it according to the drive waveform from the drive waveform generator 16 of the laser drive waveform controller 6.

According to this embodiment, because a constant current is supplied in the current setting unit 7 corresponding to the indicated amperage, amperage correction can be accomplished under full digital control, which facilitates realization of a relatively error-free laser drive unit. Of course, similar benefits to those of the foregoing embodiment are also achieved, in addition to the particular benefits of this alternative embodiment.

Figure 4:
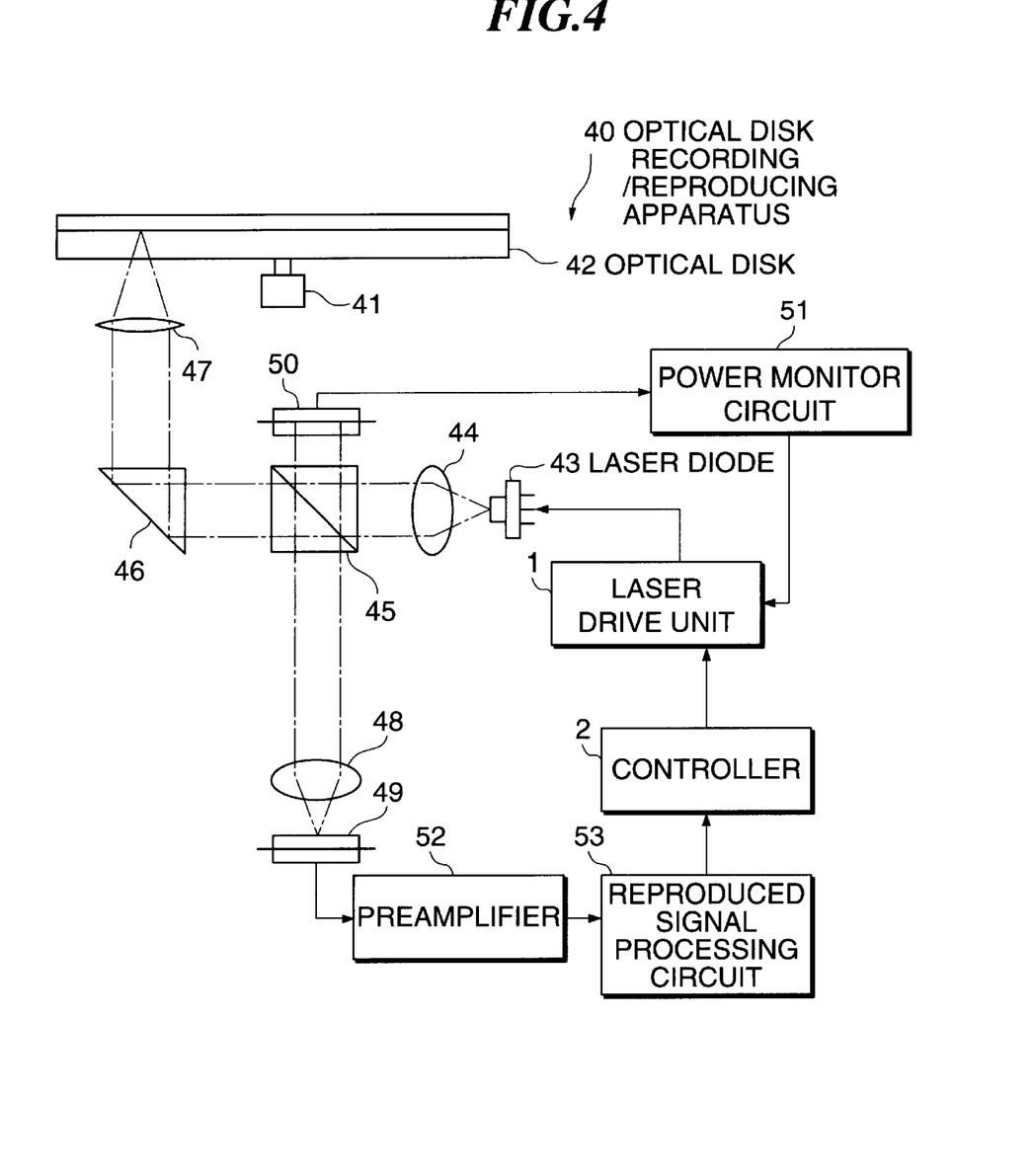
FIG. 4 is a block diagram of an optical disk recording and reproducing apparatus according to a preferred embodiment of the invention.

FIG. 4 is a schematic diagram which illustrates the configuration of an optical disk apparatus as another preferred embodiment of the present invention, mounted with the above-described laser drive unit. As shown in FIG. 4, an optical disk 42 rotationally driven by a spindle motor 41 is fitted to an optical disk recording and reproducing apparatus 40. The surface of this optical disk 42 is irradiated with a laser beam from a laser diode 43. The optical system for irradiating the surface of the optical disk 42 with the laser beam includes a collimating lens 44, a beam splitter 45, a prism 46 and an objective lens 47. Further, the optical system for detecting the reflected laser beam from the surface of the optical disk 42 comprises a condenser lens 48 and an RF signal detector 49, in addition to the objective lens 47, prism 46 and beam splitter 45. Although the optical system is divided into a detecting optical system for recorded data signals, a detecting optical system for focusing and a detecting optical system for tracking, only the optical system for recording data signals is shown here. The irradiating optical system, which includes laser diode 43 and laser drive unit 1 as an optical head, which is configured to be movable in the radial direction of the optical disk 42. The controller 2 is connected to the laser drive unit 1, and the RF signal detector 49 to a preamplifier 52, by a signal line, such as a flexible cable.

Also provided is a monitor signal detector 50 to detect part of the laser beam from the laser diode 43 for monitoring purposes. Detector 50 is connected to the laser drive unit 1 via a power monitor circuit 51. The RF signal detector 49 of the detecting optical system is connected to the controller 2 via the preamplifier 52 and a reproduced signal processing circuit 53. The laser drive unit 1 and the controller 2 shown are the same as their respective counterparts in FIG. 1 through FIG. 3.

In the foregoing configuration, the optical disk record/reproducing apparatus 40 detects the fitting of the disk 42, and turns the spindle motor 41. At the same time, in response to a control signal from the controller 2, it sends signals to the laser drive unit 1. Then the laser drive unit 1 supplies a laser drive current to the laser diode 43, and causes the laser diode 43 to emit a laser beam. Part of the laser beam emitted by the laser diode 43 is separated by the beam splitter 45 and brought to incidence on the monitor signal detector 50, but most of it is transmitted by the beam splitter 45 and reaches the prism 46. This predominant part of the beam, after being reflected by the prism 46, is focused on the surface of the optical disk 42 by the objective lens 47. The laser beam reflected by the surface of the optical disk 42 returns to the objective lens 47, prism 46 and beam splitter 45 in this order and, with its course altered by this beam splitter 45, and further focused on the RF signal detector 49 by the condenser lens 48.

The incidence of part of the laser beam emitted by the laser diode 43 on the monitor signal detector 50 causes the detector 50 to supply a monitor signal. This monitor signal is provided to the power monitor circuit 51, and fed back by the power monitor circuit 51 to the laser drive unit 1.

On the other hand, the reflected beam from the optical disk 42 on the RF signal detector 49 causes this RF signal detector 49 to supply signals. These signals are amplified by the preamplifier 52, and then detected by the reproduced signal processing circuit 53 as reproduced signals. While the output signals from the reproduced signal processing circuit 53 are mainly treated as information signals, signals for the of the disk 42 are entered into the controller 2 for use in laser control.

When the optical disk 42 is played back, control information recorded in part (such as the lead-in area) of the disk is reproduced. The recorded control information includes information unique to that particular disk, including the optimal power and strategy at the time of recording, in addition to general information such as the type of the disk or the system. In this embodiment, at the time of lead-in reproduction, reading is accomplished by the RF signal detector 49, preamplifier 52 and reproduced signal processing circuit 53. The controller 2 selects necessary information concerning the optical disk 42, and causes this selected information to be stored in a prescribed position in the laser drive unit 1. In recording onto or reproducing from the disk, the laser waveform is generated and the laser power corrected on the basis of these stored data.

In such a optical disk apparatus, elements required for the generation of the laser drive waveform, including the laser drive waveform controller 6, LD current setting unit 7, LD current output unit 8 and current setting corrector 9, can be on the same substrate as the laser drive unit 1. Accordingly, there is no need to supply a laser drive current from the controller 2 via a signal line, such as a flexible cable. This minimizes that the timing lag of the laser current and reduces the distortion of the data waveform. As a result, recording and reproduction can be accomplished at high accuracy, even on a high density recording optical disk.

Also, because part of the laser output is directly supplied to the laser drive unit 1 for use in monitoring, accurate power control is made possible. This enables power control to be accomplished to optimize the characteristics of the optical disk. Furthermore, since laser power is corrected on the basis of information recorded on the disk in advance, optimal power can be set even when the disk is changed.

Although earlier it was stated that the laser drive unit 1 is contained in the optical head and is movable, it is also acceptable to make the optical head only of an irradiating and detecting optical system with the laser drive unit 1 immovable, and such a configuration can provide similar benefits.

Figure 5:
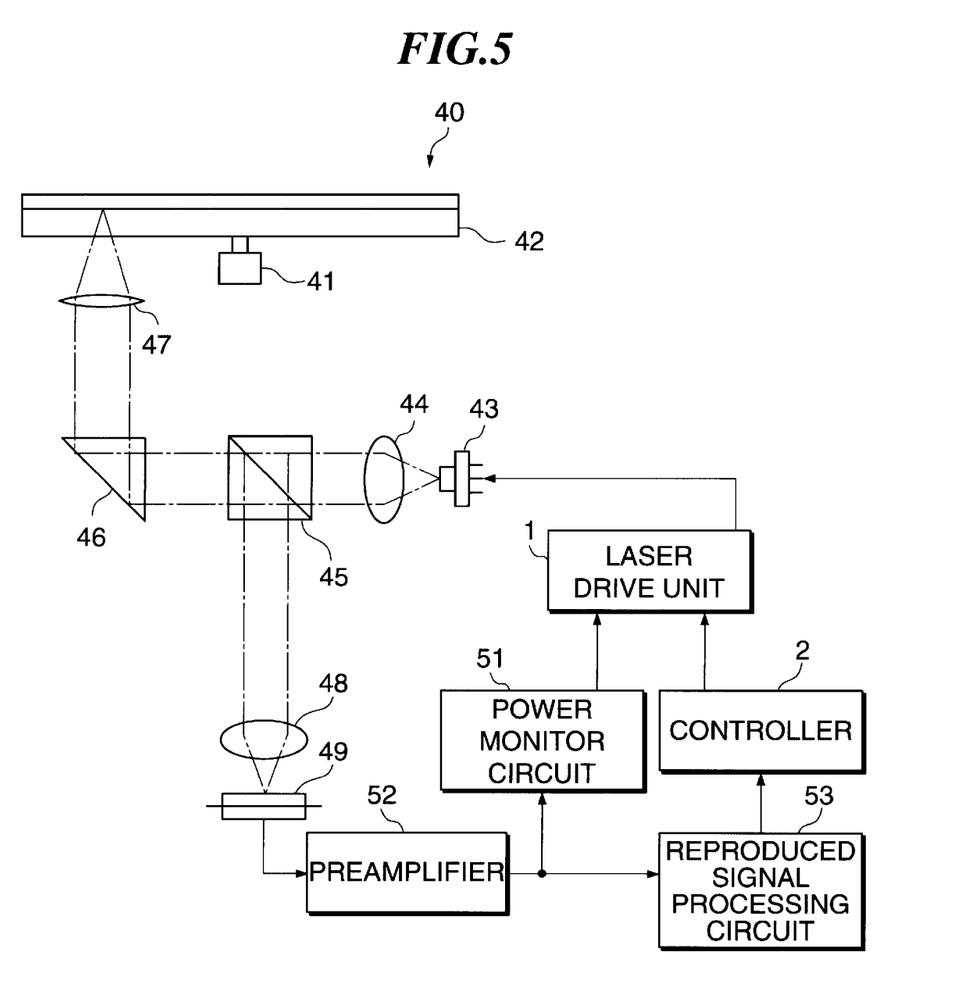
FIG. 5 is a block diagram of another configuration of the optical disk recording and reproducing apparatus according to a preferred embodiment of the invention.

FIG. 5 schematically illustrates another configuration of an optical disk drive mounted with the above-described laser drive unit. This optical disk recording and reproducing apparatus differs from the optical disk recording and reproducing apparatus illustrated in FIG. 4 in that laser power from the laser diode 43 is corrected on the basis of a signal from the above-described RF signal detector 49. Thus, as shown in FIG. 5, the output of the preamplifier 52 is provided to the laser drive unit 1 as the monitor signal via the power monitor circuit 51.

Because the beam reflected from the optical disk 42 is monitored in this configuration, variations of the reflected beam are increased by the reflectance of the optical disk 42 among other factors. These variations are compensated for by the corrective function within the laser drive unit 1.

Such an optical disk drive, where the reflected beam from the optical disk 42 is directly provided to the laser drive unit 1 as the monitor signal and undergoes compensations for differences in the disk and the system within the laser drive unit 1, makes power control independent of the disk and the system possible. This enables power control to be accomplished in such a manner to optimize the characteristics of the optical disk. Similar benefits to those of the foregoing optical disk recording/reproducing apparatuses can be achieved in addition to the particular benefits of this alternative embodiment.

The present invention, according to which the laser drive waveform controller, LD current setting unit, LD current output unit and current setting corrector are formed over the same substrate, makes possible minimizing the timing lag of the laser drive and to minimize distortion the data waveform. As a result, recording and reproduction can be accomplished at high accuracy even on a high density recording optical disk. Moreover, as part of the laser output is used as the control signal for use in monitoring, power control can be accomplished in such a manner as optimizes the characteristics of the optical disk.

The preceding has been a description of the preferred embodiment of the invention. It will be appreciated that deviations and modifications can be made without departing from the scope of the invention, which is defined by the appended claims.

What is claimed is:

1. A laser drive unit for varying a laser drive current on the basis of a laser drive waveform and supplying the laser drive current so varied to a laser, comprising:

a laser drive waveform controller for generating the laser drive waveform on the basis of information entered from a controller and supplying an indicated amperage;

a current setting unit for setting the laser drive current corresponding to the indicated amperage;

a current output unit for varying the laser drive current on the basis of the laser drive waveform and supplying the current so varied to the laser; and a current setting corrector for correcting the laser drive current set by the current setting unit on the basis of a monitor signal resulting from the monitoring of the laser beam emission from the laser, and wherein the laser drive waveform controller, the current setting unit, the current output unit and the current setting corrector are formed on the same substrate.

2. A laser drive unit, as claimed in claim 1, wherein the current setting unit and the current setting corrector are arranged in position to operation at substantially the same temperature.

3. A laser drive unit, as claimed in claim 1, wherein the current setting corrector stores a correction coefficient attributable to a difference between the apparatus and the disk in correcting the laser drive current, and uses this correction coefficient to accomplish the correction.

4. A laser drive unit for varying a laser drive current on the basis of a laser drive waveform and supplying the laser drive current so varied to a semiconductor laser, comprising:

a laser drive waveform controller for generating the laser drive waveform on the basis of information entered from a controller and supplying an indicated amperage;

a current setting unit for setting the laser drive current corresponding to the indicated amperage;

a current output unit for varying the laser drive current on the basis of the laser drive waveform and supplying the current so varied to the semiconductor laser; and a current setting corrector for correcting the laser drive current set by the current setting unit by digitally processing a monitor signal resulting from the monitoring of laser beam emissions from the semiconductor laser and thereby adjusting the indicated amperage, wherein the laser drive waveform controller, the current setting unit, the current output unit and the current setting corrector are formed on the same substrate.

5. A laser drive unit, as claimed in claim 4, wherein the current setting unit and the current setting corrector are arranged in positions for operation at substantially the same temperature.

6. A laser drive unit, as claimed in claim 4, wherein the current setting corrector stores a correction coefficient attributable to a difference between the apparatus and the disk in correcting the laser drive current, and uses this correction coefficient to accomplish the correction.

7. An optical disk drive apparatus, provided with an irradiating optical system for irradiating an optical disk with a laser beam from a laser diode and a detecting optical system for detecting a beam resulting from the reflection of the laser beam on the optical disk, for recording and reproducing information onto and from the optical disk using the laser beam, comprising:

a laser drive unit for controlling the power of the laser beam emitted from the laser diode, a controller for controlling the laser drive unit, and a detector for monitoring part of the laser beam, wherein the laser drive unit further comprises a laser drive waveform controller for generating the laser drive waveform on the basis of information entered from the controller and supplying an indicated amperage; a current setting unit for setting the laser drive current to correspond to the indicated amperage; a current output unit for varying the laser drive current on the basis of the laser drive waveform and supplying the current so varied to the laser diode; and a current setting corrector for correcting the laser drive current set by the current setting unit on the basis of a monitor signal from the detector, wherein the laser drive waveform controller, the current setting unit, the current output unit and the current setting corrector are formed on the same substrate.

8. An optical disk drive apparatus, as claimed in claim 7, wherein the laser drive unit reads information on disk characteristics previously written on the optical disk, and performs the control using this information.

9. An optical disk drive apparatus, provided with an irradiating optical system for irradiating an optical disk with a laser beam from a laser diode and a detecting optical system for detecting a beam resulting from the reflection of the laser beam on the optical disk, for recording/reproducing information onto and from the optical disk using the laser beam, comprising:

a laser drive unit for controlling the power of the laser beam emitted from the laser diode and a controller for controlling the laser drive unit, wherein the laser drive unit further comprises a laser drive waveform controller for generating the laser drive waveform on the basis of information from the controller and supplying an indicated amperage; a current setting unit for setting the laser drive current corresponding to the indicated amperage; a current output unit for varying the laser drive current on the basis of the laser drive waveform and supplying the current so varied to the laser diode; and a current setting corrector for correcting the laser drive current set by the current setting unit by digitally processing a monitor signal resulting from the monitoring of laser beam emissions from the laser diode and thereby adjusting the indicated amperage, wherein the laser drive waveform controller, the current setting unit, the current output unit and the current setting corrector are formed on the same substrate.

10. An optical disk drive apparatus, as claimed in claim 9, wherein the laser drive unit reads information concerning disk characteristics previously written on the optical disk, and performs the control on the basis of this information.

* * * * *